United States Patent
Schmidt et al.

(10) Patent No.: US 10,958,343 B1
(45) Date of Patent: *Mar. 23, 2021

(54) METHOD AND APPARATUS FOR DISTORTION CORRECTION IN OPTICAL COMMUNICATION LINKS

(71) Applicant: Juniper Networks, Inc., Sunnyvale, CA (US)

(72) Inventors: Theodore J. Schmidt, Gilroy, CA (US); Bo Zhang, San Jose, CA (US); Murat Arabaci, San Jose, CA (US); Roberto Marcoccia, San Jose, CA (US); Christian Malouin, San Jose, CA (US); Steven William Keck, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,772

(22) Filed: Jun. 28, 2019

Related U.S. Application Data (63) Continuation of application No. 15/797,241, filed on Oct. 30, 2017, now Pat. No. 10,382,131, which is a
(Continued)

(51) Int. Cl.
 *H04B 10/50* (2013.01)
 *H04B 10/2507* (2013.01)

(52) U.S. Cl.
 CPC ..... *H04B 10/2507* (2013.01); *H04B 10/5055* (2013.01); *H04B 10/50572* (2013.01)

(58) Field of Classification Search
 CPC .................... H04B 10/5055–50577
 See application file for complete search history.

(56) References Cited

U.S. PATENT DOCUMENTS

| 8,693,885 B2 | 4/2014 | Ghiasi |
| 9,438,350 B1 | 9/2016 | Schmidt |
| (Continued) | | |

OTHER PUBLICATIONS

Wang, J. et al., "Generation of Spectrally Efficient Nyquist-WDM QPSK Signals Using Digital FIR or FDE Filters at Transmitters," Journal of Lightwave Technology, vol. 30, No. 23, Dec. 1, 2012, pp. 3679-3686.

(Continued)

*Primary Examiner* — Nathan M Cors
(74) *Attorney, Agent, or Firm* — Cooley LLP (57) ABSTRACT

In some embodiments, an apparatus includes an optical transmitter module that can be electrically coupled to an electrical serializer/deserializer and a controller. The optical transmitter module can include an electrical detector that can receive an in-band signal. The electrical detector can send to the controller a first power error signal and a second power error signal based on the in-band signal. The controller can send a correction control signal to the electrical serializer/deserializer based on the first power error signal and the second power error signal such that the electrical serializer/deserializer sends a pre-emphasized signal to the optical transmitter module based on the correction control signal. In such embodiments, the first power error signal, the second power signal and the correction control signal are out-of-band signals.

19 Claims, 6 Drawing Sheets

Related U.S. Application Data continuation of application No. 15/252,923, filed on Aug. 31, 2016, now Pat. No. 9,806,812, which is a continuation of application No. 13/956,084, filed on Jul. 31, 2013, now Pat. No. 9,438,350.

(56) References Cited

U.S. PATENT DOCUMENTS

| | | | | |
|---|---|---|---|---|
| 2005/0117191 A1* | 6/2005 | Griffin | ................. | H04B 10/505 359/245 |
| 2012/0294622 A1* | 11/2012 | Holroyd | ............. | H04B 10/5051 398/131 |
| 2014/0023368 A1* | 1/2014 | Bhandare | ................ | H04J 14/06 398/65 |

OTHER PUBLICATIONS

Baprawski, J., "SerDes System CTLE Basics" [online]. Retrieved from the Internet: <URL: http://www.johnbaprawski.com/wp-content/uploads/2012/04/SerDes_System_CTLE_Basics.pdf>, Mar. 22, 2012, 10 pages.

Wu, R-B, "Equalization" [online]. Retrieved from the Internet: <URL: http://www.johnbaprawski.com/wp-content/uploads/2012/04/SerDes_System_CTLE_Basics.pdf>, Sep. 13, 2011, 22 pages.

\* cited by examiner

METHOD AND APPARATUS FOR DISTORTION CORRECTION IN OPTICAL COMMUNICATION LINKS

PRIORITY TO RELATED APPLICATION

This application is a continuation of U.S. application Ser. No. 15/797,241, (now U.S. Pat. No. 10,382,131) entitled "METHOD AND APPARATUS FOR DISTORTION CORRECTION IN OPTICAL COMMUNICATION LINKS," and filed Oct. 30, 2017, which is a continuation of U.S. application Ser. No. 15/252,923, (now U.S. Pat. No. 9,806,812) entitled "METHOD AND APPARATUS FOR DISTORTION CORRECTION IN OPTICAL COMMUNICATION LINKS", and filed Aug. 31, 2016, which claims priority to and is a continuation of U.S. application Ser. No. 13/956,084, (now U.S. Pat. No. 9,438,350) entitled "METHODS AND APPARATUS FOR DISTORTION CORRECTION IN OPTICAL COMMUNICATION LINKS" and filed Jul. 31, 2013; the content of each of which is expressly incorporated herein by reference in its entirety.

BACKGROUND

Some embodiments described herein relate generally to methods and apparatus for the detection and correction of distortion of the transmitted signal in an optical transmitter. In particular, but not by way of limitation, some of the embodiments described herein relate to methods and apparatus for the detection and correction of frequency-based distortion of the transmitted signal associated with both an analog implementation and a digital implementation of an optical transmitter.

High data rate optical networks (e.g., 100 Gbit/s and beyond) can be enabled by, for example, an optical M-ary quadrature amplitude modulation (M-QAM) scheme with digital signal processing (DSP). Transmitter side serializer/deserializer (SerDes) and digital-to-analog converters (DACs) are building blocks for spectrally-efficient, multi-level signal generation and spectral manipulation. High data rate communication interfaces, however, can impose high signal integrity demands that are difficult to accomplish without the use of pre-emphasis and/or post-compensation techniques. Known methods of pre-emphasis based signal correction include providing variable analog peaking in a SerDes along the transmitter-side orientation (TX) or the use of a digital filter in conjunction with a DAC.

Adjusting the pre-emphasis parameters of the SerDes TX can be particularly difficult if the interconnect properties are not known at the time of manufacture and the pre-emphasis parameters cannot be set accurately in the factory. This is typically the case when pluggable photonic elements are used, where the properties of the photonic elements can vary dramatically from vendor to vendor and over generations of photonic elements. Hence, this presents challenges for component designers and board designers that can prevent in-factory calibration and the correction of distortion.

Accordingly, a need exists for methods and apparatus for automatically setting the SerDes TX pre-emphasis parameters for a specific optical transmitter system. Such optimization can be implemented at the time of port turn up, after reset, or continuously optimized in the background to compensate for signal power fluctuations due to, for example, temperature effects and/or temporal effects.

SUMMARY

In some embodiments, an apparatus includes an optical transmitter module that can be electrically coupled to an electrical serializer/deserializer and a controller. The optical transmitter module can include an electrical detector that can receive an in-band signal. The electrical detector can send to the controller a first power error signal and a second power error signal based on the in-band signal. The controller can send a correction control signal to the electrical serializer/deserializer based on the first power error signal and the second power error signal such that the electrical serializer/deserializer sends a pre-emphasized signal to the optical transmitter module based on the correction control signal. In such embodiments, the first power error signal, the second power signal and the correction control signal are out-of-band signals.

DETAILED DESCRIPTION

In some embodiments, an apparatus includes an optical transmitter module that can be electrically coupled to an electrical serializer/deserializer and a controller. The optical transmitter module can include an electrical detector that can receive an in-band signal. The electrical detector can send to the controller a first power error signal and a second power error signal based on the in-band signal. The controller can send a correction control signal to the electrical serializer/deserializer based on the first power error signal and the second power error signal such that the electrical serializer/deserializer modifies a pre-emphasis function, based on the correction control signal, and applies the pre-emphasis function to incoming signals to generate and send a pre-emphasized signal to the optical transmitter module. In such embodiments, the pre-emphasis function can be a transfer function or an adjustment functions and the first power error signal, the second power signal and the correction control signal can be out-of-band signals.

In some embodiments, an apparatus includes a controller that is operatively coupled to an electrical serializer/deserializer and an optical transmitter module having an electrical detector. The controller can receive from the electrical detector a first power error signal and a second power error signal based on an in-band signal. The controller can send a correction control signal to the electrical serializer/deserializer based on the first power error signal and the second power error signal such that the electrical serializer/deserializer sends a pre-emphasized signal to the optical transmitter module based on the correction control signal. In such embodiments, the first power error signal, the second power signal and the correction control signal are out-of-band signals.

In some embodiments, an apparatus includes an electrical serializer/deserializer that is operatively coupled to a controller and an optical transmitter module having an electrical detector. The electrical serializer/deserializer can send to the electrical detector an in-band signal such that the optical transmitter module sends to the controller a first power error signal and a second power error signal. The electrical serializer/deserializer can receive from the controller a correction control signal based on the first power error signal and the second power error signal, and can send to the optical transmitter module a pre-emphasized signal based on the correction control signal. In such embodiments, the first power error signal, the second power signal and the correction control signal are out-of-band signals.

As used in this specification, the terms "controller" and "control module" are used interchangeably, unless the context clearly dictates otherwise, and can refer to any hardware and/or software module that can receive a first power error signal and a second power error signal and generate a correction control signal based on the first power error signal and the second power error signal.

As used in this specification, the terms "electrical serializer/deserializer" and "serializer/deserializer module" are used interchangeably, unless the context clearly dictates otherwise, and can refer to any hardware and/or software module that can receive a correction control signal and generate and/or modify a pre-emphasized signal based on the correction control signal.

As used herein, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "an optical transmitter system" is intended to mean a single optical transmitter system or multiple optical transmitter systems.

Figure 1:
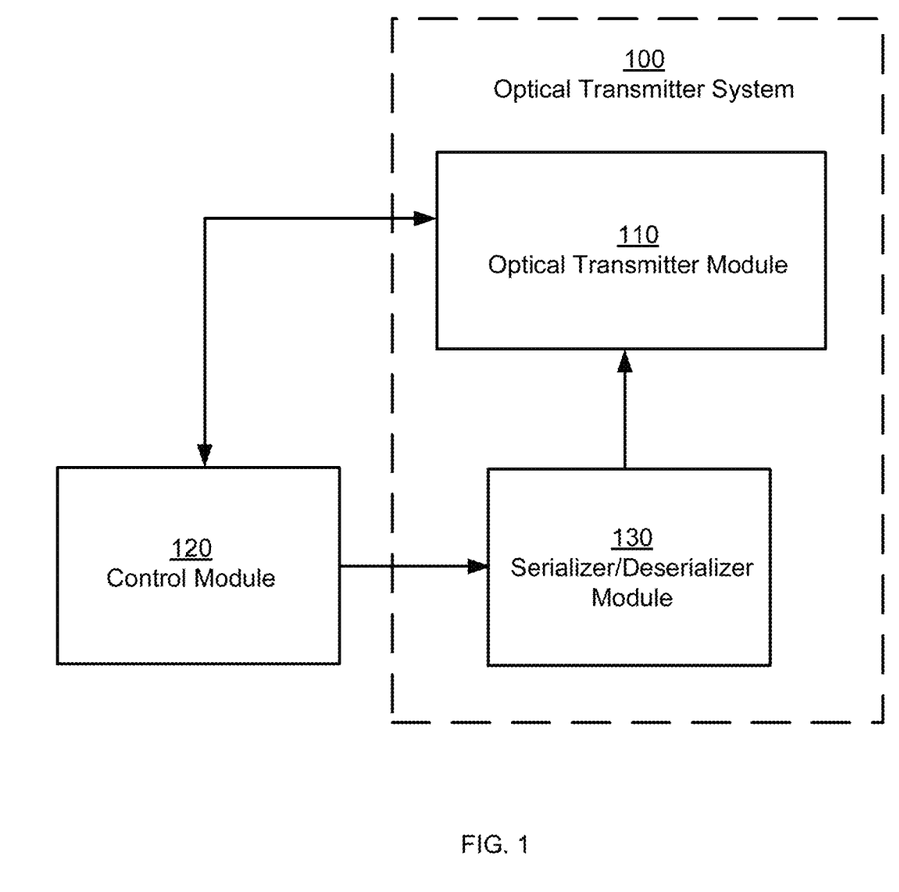
FIG. 1 is a system block diagram of an optical transmitter system with a control module, according to an embodiment.

FIG. 1 is a system block diagram of an optical transmitter system with a control module, according to an embodiment. The optical transmitter system 100 includes an optical transmitter module 110 and a serializer/deserializer module 130 that are operably coupled to each other. The optical transmitter module 110 and the serializer/deserializer module 130 are both operably coupled to a control module 120. Although the control module 120 is shown in FIG. 1 as being external to the optical transmitter system 100, in other configurations, the control module 120 can be internal to the (i.e., a part of) optical transmitter system 100. The optical transmitter system 100 can be any high data rate optical transmitter system such as, for example, an optical M-ary quadrature amplitude modulation (M-QAM) transmitter, a polarization multiplexed (PM) M-QAM transmitter, and/or the like. The optical transmitter module 110 can include a set of Mach-Zehnder interferometers (or modulators) for the in-phase portion (I-channel or I-phase modulator) and the quadrature portion (Q-channel or Q-phase modulator), respectively, of the optical transmitter system 100. The I-phase modulator can be coupled to a first electrical detector (not shown in FIG. 1) and the Q-phase modulator can be coupled to a second electrical detector (not shown in FIG. 1). Additionally, the optical transmitter module 110 can include, for example, a tunable laser source, an optical shutter (for preventing the calibration signals from being transmitted and/or corrupting the transmitted signal as explained in greater detail herein), one or multiple amplifiers (or drivers), and one or multiple electrical detectors. The different components of the optical transmitter module 110 will be discussed in greater detail in FIG. 2.

As shown in FIG. 1, the optical transmitter module 110 can be electrically coupled to the serializer/deserializer module 130 and the control module 120. The optical transmitter module 110 can include an electrical detector (not shown in FIG. 1) that can receive an in-band signal from the serializer/deserializer module 130. In some instances, the optical transmitter module 110 (i.e., the electrical detector) can filter the in-band signal at a first frequency range to produce a first filtered signal, and can filter the in-band signal at a second frequency range different from the first frequency range to produce a second filtered signal. In such instances, the optical transmitter module 110 can generate a first power error signal associated with the first filtered signal and a second power error signal associated with the second filtered signal. In such instances, the optical transmitter module 110 can send to the control module 120, the first power error signal and the second power error signal based on the in-band signal.

In other instances, the optical transmitter module 110 can receive from the serializer/deserializer module 130, a first calibration signal (in-band signal) having a pre-determined digital bit stream associated with a first frequency, and a second calibration signal (in-band signal) having a pre-determined digital bit stream associated with a second frequency (that is different from the pre-determined digital bit stream associated with the first frequency). In such instances, the optical transmitter module 110 can generate a first power error signal that is associated with the first calibration signal, and a second power error signal is associated with the second calibration signal. In such instances, the optical transmitter module 110 can send to the control module 120, the first power error signal based on the first calibration signal and the second power error signal based on the second calibration signal.

The control module 120, in some configurations, can be a stand-alone hardware module that can be external to the optical transmitter system 100 as shown in FIG. 1. In other configurations, the control module 120 can be a hardware module located on the host circuit board of the optical transmitter system 100. In yet other configurations, the control module 120 can be software module stored in the memory and/or executed in the processor of the optical transmitter system 100. The control module 120 can be operatively coupled to the electrical serializer/deserializer module 130 and the optical transmitter module 110 (that includes one or multiple electrical detectors). The control module 120 can receive the output of the electrical detectors in the optical transmitter module 110 that can include the first power error signal and the second power error signal (that are either based on an in-band signal, or a first calibration signal and a second calibration signal). The control module 120 can compute the parameters or characteristics of a correction control signal based on the properties or characteristics of the first power error signal and the second power error signal (e.g., magnitude of the signals, phase of the signals, frequency of the signals, etc.). The control module 120 can generate a correction control signal based on parameters or characteristics computed and can send the correction control signal to the electrical serializer/deserializer module 130 such that the serializer/deserializer module 130 can generate and/or modify a pre-emphasized signal to the optical transmitter module 110 based on the correction control signal.

The serializer/deserializer module 130 can be a hardware module of the optical transmitter system 100. The serializer/deserializer module 130 is operably coupled to the optical transmitter module 110 (that includes one or multiple electrical detectors) and the control module 120 as seen in FIG. 1. The serializer/deserializer module 130 can include, for example, a serializer-deserializer/digital-to-analog converter (SerDes/DACs) module, a calibration signal generation module and a pre-emphasis generation module (not shown in FIG. 1, but described in greater detail in FIG. 2). In some instances, the serializer/deserializer module 130 can send to the electrical detector of the optical transmitter module 110 an in-band signal, such that the optical transmitter module 110 can send to the control module 120 a first power error signal and a second power error signal. In other instances, the serializer/deserializer module 130 can send to the optical transmitter module 110 a first calibration signal having a pre-determined digital bit stream associated with a first frequency and a second calibration signal having a pre-determined digital bit stream associated with a second frequency such that the optical transmitter module 110 can send to the control module 120 a first power error signal and a second power error signal. The serializer/deserializer module 130 can receive from the control module 120 a correction control signal (that is based on the first power error signal and the second power error signal). In some configurations, the serializer/deserializer module 130 can generate or produce a pre-emphasized signal (based on the correction control signal) that compensates for or substantially compensates for the frequency-dependent distortions in the optical transmitter system 100. As discussed above, in some configurations, the serializer/deserializer module 130 can include a serializer-deserializer/digital-to-analog converter (SerDes/DACs) module. In some instances, the (SerDes/DACs) module can include a first digital-analog converter (DAC) and a second DAC. In such instances, the serializer/deserializer module 130 can send a first calibration signal from the first DAC to a first electrical detector; the serializer/deserializer module 130 can also send a second calibration signal from the second DAC to a second electrical detector. In such instances, the I-phase modulator is coupled to the first electrical detector and the Q-phase modulator is coupled to the second electrical detector.

Figure 2:
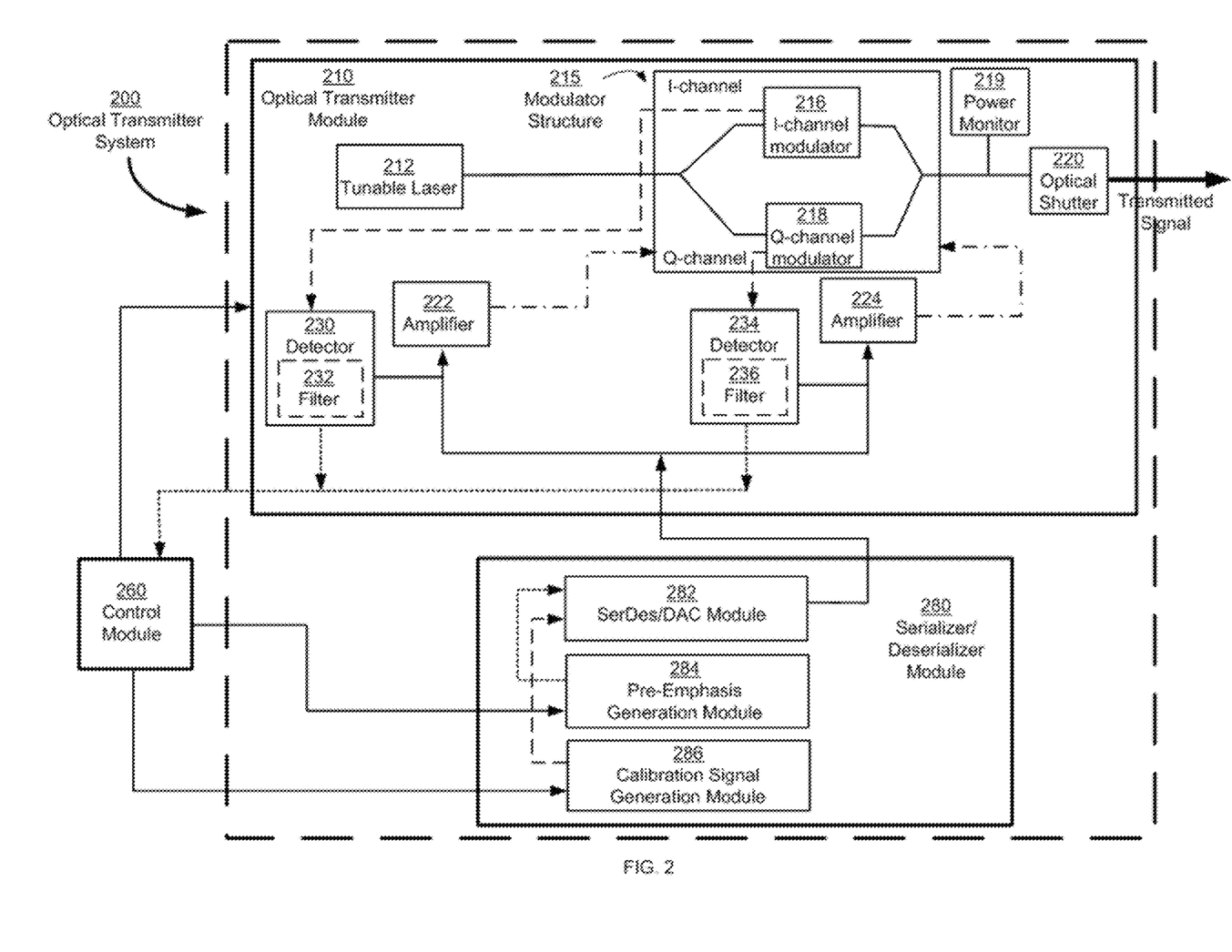
FIG. 2 is a system block diagram of an optical transmitter system with a control module, according to an embodiment.

FIG. 2 is a system block diagram of an optical transmitter system with a control module, according to an embodiment. The optical transmitter system 200 includes an optical transmitter module 210 that is operably coupled to a serializer/deserializer module 280. The optical transmitter module 210 and the serializer/deserializer module 280 are also operably coupled to a control module 260 that is external to the optical transmitter system 200. Although the control module 260 is shown in FIG. 2 as being external to the optical transmitter system 200, in other configurations, the control module 260 can be internal to (part of) the optical transmitter system 200.

The optical transmitter module 210 can be a hardware module in the optical transmitter system 200 and can include a tunable laser 212, a modulator structure 215 that includes an I-channel modulator 216 and a Q-channel modulator 218, a (optical) power monitor 219, an optical shutter 220, amplifiers (or drivers) 222 and 224, and (electrical) detectors 230 and 234. The serializer/deserializer module 280 includes a SerDes/DAC module 282, a pre-emphasis generation module 284, and a calibration signal generation module 286. The output of the detectors 230 and 234 are connected to the control module 260 and the output of the control module 260 is connected to the pre-emphasis generation module 284 and the calibration signal generation module 286.

The tunable laser 212 can provide an electromagnetic continuous wave at a carrier frequency on which information can be imposed by the optical transmitter system 200 by, for example, increasing the carrier signal strength, varying the carrier base frequency, varying the carrier wave phase, or by other means to transmit signals (or data) to external devices. The output from the optical transmitter system 200 is the modulated and transmitted signal. The modulator structure 215 can receive an incident optical signal (incident light) from the tunable laser 212 and can split the incident optical signal into a first optical signal and a second optical signal. The first optical signal can be sent to the I-channel modulator 216 and the second optical signal can be sent to the Q-channel modulator 218. The optical signals from the I-channel modulator 216 and the Q-channel modulator 218 can be interferometrically combined to form a single optical signal with information imparted in both the magnitude and phase of the optical signal. Note in some instances, the output optical signal from the modulator structure 215 can be combined with the optical output signal from a second modulator structure (not shown) such that the polarization of the optical output signal from the first modulator structure 215 is substantially orthogonal to that from the second modulator structure once combined.

As mentioned above, the modulator structure 215 includes an I-channel modulator 216, and a Q-channel modulator 218. The I-channel modulator 216 can be, for example, a Mach-Zehnder modulator (MZM) associated with the in-phase portion of the optical transmitter system 200. Similarly, the Q-channel modulator 218 can also be, for example, a MZM associated with the quadrature-phase portion of the optical transmitter system 200. The combined output signal of the modulator structure 215 can be detected or monitored by the (optical) power monitor 219. The optical power monitor 219 can be, for example, any type of low-speed, low-bandwidth optical detectors available commercially that can be used for the detection of the combined output of the modulator structure 215. The optical shutter 220 can have a first configuration and a second configuration. In some instances, when calibration signals (pre-determined digital bit streams) are sent from the serializer/deserializer module 280 to the optical transmitter module 210, the optical shutter 220 can be in the first configuration (closed) and can block output from the optical transmitter system 200. In other instances, when no calibration signals are sent from the serializer/deserializer module 280 to the optical transmitter module 210, the optical shutter 205 can be in the second configuration (open) and can transmit output from the optical transmitter system 200.

The detectors 230 and 234 can be electrical detectors that can be used, in some instances, to measure the power of the calibration signals sent from the serializer/deserializer module 280 to generate a first power error signal and a second power error signal. In other instances, the detectors 230 and 234 can be electrical detectors that can implement a filtering functionality to filter an in-band input signal sent from the serializer/deserializer module 280 at two different frequency ranges to generate a first filtered signal and a second filtered signal. In such instances, the detectors 230 and 234 can also measure the power of the first filtered signal and the second filtered signal to generate a first power error signal and a second power error signal. For example, the detectors 230 and 234 each can be, for example, a root mean square (RMS) detector that outputs a direct current (DC) voltage that is linearly proportional to the log of the input signal power, a threshold detector that uses an external resistor or threshold voltage and can output a transistor-transistor logic (TTL) compatible signal when the input signal power level exceeds the preset threshold, a log power detector that can provide a DC output voltage that is log-linearly proportional to the input signal power level, an Schottky peak detector that can combine a temperature compensated Schottky diode peak detector and a buffer amplifier to detect the input signal voltage peak using the on-chip Schottky diode, and/or the like. After measuring or detecting the power of the calibration signals or the filtered signals, the detectors 230 and 234 can send the first power error signal and the second power error signal (that includes the output voltage level representative of the power of the calibration signals or the filtered signals) to the control module 260 as shown in FIG. 2.

The (analog) output signals from the SerDes/DAC module 282 are sent to the amplifiers (or drivers) 222 and 224 that are associated with the I-channel and the Q-channel of the optical transmitter system 200, respectively. The amplifiers 222 and 224 can be a type of electronic amplifier that can be implemented in an integrated circuit on a chip (hardware) that can convert a low-power input signal into a higher powered signal for, for example, driving a high powered device such as the I-channel modulator 216 and/or the Q-channel modulator 218, and/or the like. The amplifiers 222 and 224 can be optimized, for example, to have high efficiency, high output power compression, low return loss, high gain, and optimum heat dissipation. The amplified (analog) signals from the amplifiers 222 and 224 are sent to the I-channel modulator 216 and the Q-channel modulator 218, respectively, of the optical transmitter system 200.

The control module 260 can be a hardware module and/or software module stored in the memory and/or executed in a processor of a stand-alone device that, in some configurations, is external to the optical transmitter system 200. In other configurations, the control module 260 can be a hardware module and/or software module stored in the memory and/or executed in a processor located on the host circuit board of the optical transmitter system 200. The control module 260 receives the output of the detectors 230 and 234 (of the optical transmitter module 210) that can include the first power error signal and the second power error signal and are representative of the input signal power fluctuations due to, for example, temperature changes and/or temporal effects. The control module 260 can generate a correction control signal that is based on the first power error signal and the second power error signal. The control module 260 can send the correction control signal to the serializer/deserializer module 280 such that the serializer/deserializer module 280 can, in some instances, generate and/or modify a pre-emphasized signal to the optical transmitter module 210 based on the correction control signal. In other instances, the serializer/deserializer module 280 can generate a pre-emphasized signal based on the correction control signal and can send the pre-emphasized signal to the optical transmitter module 210, where the pre-emphasized signal results in an equalized signal for which the frequency-dependent distortions in the optical transmitter system 200 have been compensated or substantially compensated. In some configurations, the control module 260 can also compute the parameters of calibration signals parameters that in some instances, can be sent from the serializer/deserializer module 280 to the optical transmitter module 210 to detect and correct for input signal power fluctuations due to temperature and temporal effects. Note the calibration signals are generated by the calibration signal generation module 286 based on the parameters computed by the control module 260. In such configurations, the control module 260 can send a signal to the serializer/deserializer module 280 that includes information regarding the calibration digital bit streams that are to be generated by the serializer/deserializer module 280.

The control module 260 can also control the bias points of the I-channel modulator 216 and the Q-channel modulator 218, and the driving level of the amplifiers (or drivers) 222 and 224. The halfwave voltage, $V_{pi}$, of a modulator (216 and/or 218) is defined as the difference between the applied voltage at which the signals in each branch of the modulator (216 and/or 218) are in phase and the applied voltage at which the signals are 180° out of phase. Hence, $V_{pi}$ is the voltage difference between maximum and minimum output signal power of the modulator (216 and/or 218). For a modulator (216 and/or 218) to be used most efficiently in a communications system, it is desirable for the value of $V_{pi}$ to be accurately determined, for example, to determine the amplifier 222 and 224 settings. If the modulator (216 and/or 218) bias is set at null bias, a driving level of $2*V_{pi}$ from the amplifier (222 and 224) can be applied. If the modulator (216 and/or 218) bias is set at quadrature bias, a driving level of $V_{pi}$ from the amplifier (222 and 224) can be applied. Additionally, the control module 260 can also send a signal that can control the configuration status of the optical shutter 220 during operation of the optical transmitter system 200. A detailed description of the functionalities of the control module 260 is provided herein with respect to FIG. 3.

The calibration signal generation module 286 can be a hardware module and/or software module stored in the memory and/or executed in a processor of the optical transmitter system 200. In some instances, when the optical transmitter system 200 is in operation, the calibration signal generation module 286 can receive a signal from the control module 260 that is representative of a first pre-determined calibration digital bit stream having a first frequency and a second calibration digital bit stream having a second frequency. The calibration signal generation module 286 can generate the first calibration signal and the second calibration signal and send the calibration signals to the amplifiers (or drivers) 222 and 224 via the SerDes/DAC module 282. In some instances, the first calibration signal can be a first pre-determined digital bit stream sent from the SerDes/DAC module 282 at a first frequency. In such instances, the second calibration signal can be a second pre-determined digital bit stream with a second frequency (different from the first frequency) that is sent from the SerDes/DAC module 282. The (digital) calibration signals can be a specific kind of electrical waveform varying between two voltage levels that correspond to two logic states (e.g., 'low state' for '0' and 'high state' for '1', respectively). The voltage levels generated by the calibration signal generation module 286 can be compatible with digital electronics input/output (I/O) standards such as, for example, Transistor-Transistor Logic (TTL), Low-voltage TTL (LVTTL), Low Voltage Complementary Metal Oxide Semiconductor (LVCMOS), Low-voltage differential signaling (LVDS), and/or the like. For example, the first calibration signal can be a "11001100" repeating pattern that can correspond to 8 GHz for a 32 Gbps data stream, and the second calibration signal can be a "1111111100000000111111100000000" repeating bit pattern that can correspond to 2 GHz for a 32 Gbps data stream.

In such instances, the power of the calibration signals can be measured or detected by the detectors 230 and 234 to generate a first power error signal (based on the first calibration signal) and a second error signal (based on the second calibration signal), respectively. The detectors 230 and 234 can collectively send the first power error signal and the second power error signal to the control module 260 as shown in FIG. 2. In such configurations, the amplifiers (or drivers) 222 and 224 are disabled and/or the optical shutter 220 is in the closed configuration when the detectors 230 and 234 receive the first calibration signal and the second calibration signal. Note that the calibration signal generation module 286 can generate and send the calibration signals to the SerDes/DAC module 282 that includes the serializer-deserializer/digital-analog converters (SerDes/DACs) associated with the in-phase portion (I-channel) and quadrature portion (Q-channel), respectively, of the optical transmitter system 200. Hence, the first calibration signal and the second calibration signal are sent through the SerDes/DAC module 282, the amplifiers 222 and 224, and then modulated on an optical carrier wave via the I-channel modulator 216 and the Q-channel modulator 218 (of the modulator structure 215), respectively.

In other instances, when the optical transmitter system 200 is in operation, the serializer/deserializer module 280 can send an input in-band signal to the amplifiers 222 and 224 of the optical transmitter module 210. In such instances, the detector 230 can optionally include a filter 232 (as shown by the dashed box in FIG. 2), and the detector 234 can optionally include a filter 236 (as shown by the dashed box in FIG. 2). The filters 232 and 236 can filter the input in-band signal at a first frequency range to generate a first filtered signal and a second frequency range (different from the first frequency range) to generate a second filtered signal, respectively. The detectors 230 and 234 can generate a first power error signal based on the first filtered signal and a second power error signal based on the second filtered signal. The detectors 230 and 234 can collectively send the first power error signal and the second power error signal to the control module 260 as shown in FIG. 2. In such instances, the amplifiers (or drivers) 222-224 are activated, operative or functional (i.e., not disabled) when the detectors 230 and 234 receive the in-band input signal from the serializer/deserializer module 280. The advantage of this approach is that the broadband input in-band signal being filtered may be actual data, so the pre-emphasis settings can be determined and adjusted (via different signal compensation steps) while the optical transmitter system 200 is in use.

The SerDes/DAC module 282 can be a hardware module that can be, for example, manufactured on a stand-alone integrated circuit chip or included in the processor of the optical transmitted system 200. The SerDes/DAC module 282 can include one or multiple serializer-deserializer/digital-analog converters (SerDes/DACs) that are associated with the in-phase portion (I-channel) and quadrature portion (Q-channel) of the optical transmitter system 200. The SerDes/DACs can provide spectrally efficient, multi-level signal generation and spectral manipulation. Each of the SerDes/DACs (of the SerDes/DAC module 282) can include one or both of a serializer/deserializer (SerDes) and a digital-analog converter (DAC). A SerDes (or serializer/deserializer) typically includes a pair of functional blocks commonly used in high speed communications to compensate for limited input/output. The SerDes can be an integrated circuit transceiver that converts parallel data to serial data and vice-versa. The transmitter section of the SerDes is a parallel-to-serial converter, and the receiver section of the SerDes is a serial-to-parallel converter. Multiple SerDes interfaces can often be housed in a single integrated circuit package. The SerDes facilitates the transmission of parallel data between two locations over serial streams, thus reducing the number of data paths and the number of connecting pins or wires used on a device. In some instances, the SerDes devices (or modules) are capable of full-duplex operation, where data conversion can take place in both directions simultaneously.

The digital-analog converter (DAC) of each individual SerDes/DAC (of the SerDes/DAC module 282) can convert the digital bit streams of the calibration signal and/or the data signal (of the real data) into a continuously varying analog signal. In some instances, the digital-to-analog conversion can degrade a signal, and hence conversion setpoints can be set such that any errors induced in the conversion process are minimized. Note that the DACs are optional or not present for some modulation formats (e.g., quadrature phase-shift keying (QPSK) modulation also referred to as 4-quadrature amplitude modulation (4-QAM)), as simple on-off-keying (OOK) signals on each channel are sufficient. For such modulation formats, the DACs can be 1-bit DACs.

The pre-emphasis generation module 284 can be hardware module and/or software module stored in the memory and/or executed in a processor of the optical transmitter system 200. The pre-emphasis generation module 284 can receive a correction control signal from the control module 260 that is representative of the calculated parameters of the pre-emphasized signal. The pre-emphasis generation module 284 can generate a pre-emphasized signal that can be sent to the SerDes/DAC module 282 via an out-of-band communication channel. The pre-emphasized signal can be sent to the optical transmitter module and can equalize (or compensate) for distortions associated with the first calibration signal (at a first frequency range) and the second calibration signal (at a second frequency range) and/or equalize (or compensate) for distortions associated with the first filtered signal (at a first frequency range) and the second filtered signal (at a second frequency range). The equalization process can be repeated until the appropriate tone ratio (ratio of the power of the two calibration signals and/or filtered signals) reaches a pre-determined level that is indicative of optimal system performance.

The pre-emphasis generation module 284 can be implemented in some instances, via digital filtering methods and in other instances, via analog filtering methods. Digital filtering can be implemented either in the time domain with finite-impulse response (FIR) filters or in the frequency domain with frequency-domain-equalization (FDE) filters. In terms of the filter structure, a digital Finite Impulse Response (FIR) filter in the time-domain can be represented as cascaded tapped delay elements, with each delay element being equal to the symbol period of the signal, T, or a fraction of T (e.g., with T/2) and controllable weights (i.e., filter coefficients). Although T/2-spaced FIR filters occur typically at the Rx-side (receiver-side) due to sampling at two times the symbol rate (2/T), fractionally-spaced FIR filters for pre-emphasis are also currently being developed and/or implemented. For example, a time-domain digital FIR filter can be implemented with a weighted sum of tapped delay elements. One method of setting the taps of the time-domain digital FIR filter is to derive the desired frequency domain peaking responses and perform an inverse transform to obtain the time domain impulse responses (that corresponds to the tap or filter coefficients). The desired frequency-domain peaking response can be obtained by subtracting the measured channel response (by measuring the peak detector output when no pre-emphasis filter is set)

from the desired (e.g., flat passband) response. Another method of setting the taps of the time-domain digital FIR filter is to implement an adaptive algorithm to minimize the error signal by automatically adjusting the tap coefficients until the error signal falls within a pre-determined range.

A digital filter (e.g., FDE) in the frequency-domain can be implemented with any one of the many Fast Fourier Transform or Inverse Fast Fourier Transform (FFT/IFFT) structures (or modules). For example, a frequency-domain digital filter can be implemented using an overlap-save technique. With an overlap-and-save FDE filter, the digital inputs are divided into blocks, such that the block length equals the size of the underlying fast Fourier transform (FFT) in addition to a number of overlap samples between neighboring blocks. Each block is first converted into the frequency domain, and after the equalization in the frequency domain, the block is converted back into the time domain by inverse fast Fourier transform. The overlap in a block can be discarded when this block is stored as filtered results.

In some instances, when the pre-emphasis generation module 284 is implemented via analog filtering methods, the analog filter would typically be located after the DAC (in the SerDes/DAC module 282). Analog filters in the pre-emphasis generation module 284 can be implemented by several methods, including active and passive designs. For example, in some configurations, the analog filters can be implemented with a Continuous Time Linear Equalizer (CTLE) approach that includes high-pass filtering (HPF) with one or multiple poles and zeros to provide emphasis in the high frequency response. The HPF CTLE analog filter implementation can also include the use of high frequency poles to force the attenuation of high frequency noise so that SerDes system performance is not degraded. In other configurations, the analog filters can be implemented with a CTLE approach using a feed-forward equalizer (FFE) that can provide emphasis in the high frequency response using delays, gains and a summer. The FFE CTLE analog filter implementation is a FIR filter. The input digital signal can propagate through a series of delay lines, where each delay line is equal to one bit unit time interval (UI). The input signal is sampled before and after each delay line and is multiplied by the FIR tap coefficients (filter coefficients). The outputs from the FIR taps can be summed to produce the FFE CTLE output. The number of taps can depend on the length of the channel impulse response relative to one bit unit time interval.

Analog filters can be used as the sole device in the pre-emphasis generation module 284 to generate the pre-emphasized signal or can be used in conjunction with a digital filter. If used in conjunction with a digital filter, the analog filter can be implemented after the DAC. Note that the analog filter alone might not be able to meet all the compensation targets for the pre-emphasized signal for all applications, but can serve to substantially meet a majority of the compensation targets, thus leaving the digital filters to compensate for the remaining targets. Note that the components of the serializer/deserializer module 280 shown in FIG. 2 are represented in a specific order in FIG. 2 by way of example only, and not by limitation. In some configurations, when an analog implementation is used in the pre-emphasis generation module 284, the pre-emphasis generation module 284 is located after the SerDes/DAC module 282. In other configurations, when a digital implementation is used in the pre-emphasis generation module 284, the pre-emphasis generation module 284 is located before the SerDes/DAC module 282.

Figure 3:
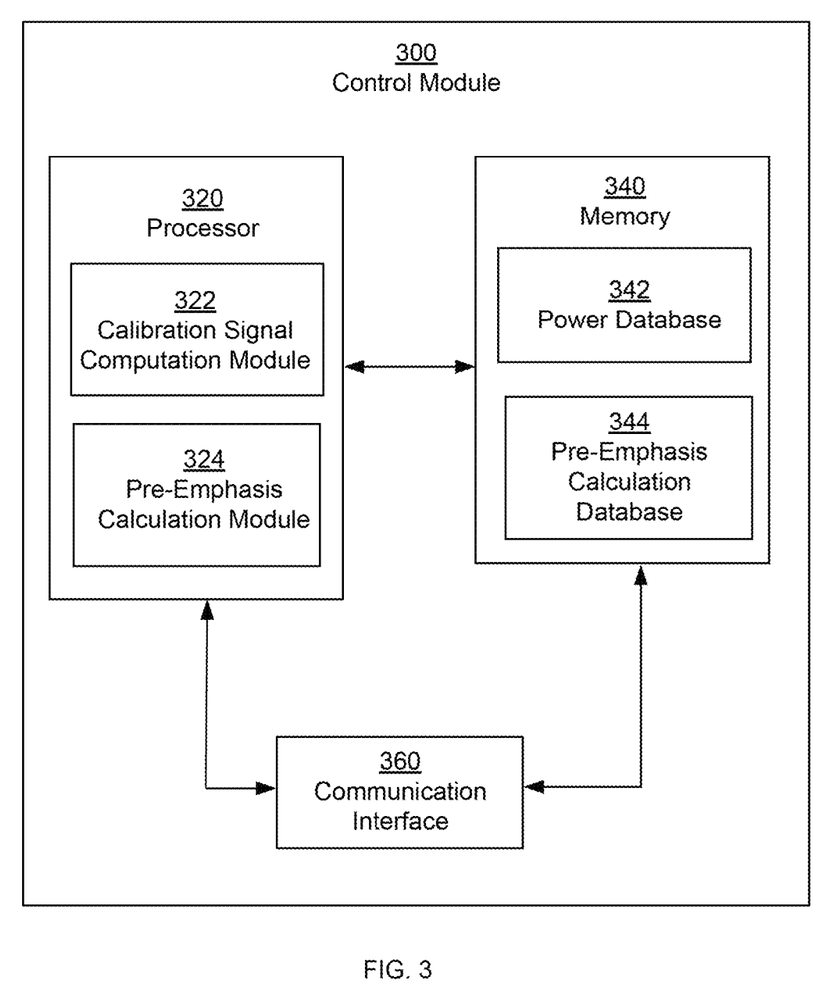
FIG. 3 is a system block diagram of a control module, according to an embodiment.

FIG. 3 is system block diagram of a control module 300, according to an embodiment. The control module 300 in FIG. 3 is similar to or substantially similar to the control module 120 in FIG. 1 and the control module 260 in FIG. 2. As described above, the control module 300 can be external to the optical transmitter system or located on the host circuit board of the optical transmitter system. When located on the host circuit board of the optical transmitter system, the control module 300 can be a hardware module and/or software module stored in the memory and/or executed in a processor on the host circuit board of the optical transmitter system. The control module 300 includes a memory 340 that is operably coupled to a processor 320. The control module 300 also includes a communication interface 360 that is operably coupled to both the memory 340 and the processor 320.

The communications interface 360 of the control module 300 can include, for example, one or multiple input/output ports (not shown in FIG. 3) that can be used to implement one or more connections between the control module 300 and the optical transmitter module and the serializer/deserializer module (e.g., optical transmitter module 210 in FIG. 2 and serializer/deserializer module 280 in FIG. 2). As such, the control module 300 can be configured to receive data signals and/or send data signals through one or more ports of the communications interface 360, which are connected to the communications interfaces of the optical transmitter module and the serializer/deserializer module (not shown in FIGS. 2 and 3). In some instances, for example, when the control module 300 is external to the optical transmitter system, the control module 300 can implement a first wired connection (e.g., current mode logic (CML) signaling, also known as source coupled logic (SCL) signaling, analog signaling, combination of digital and analog signaling, and/or the like) with the optical transmitter module that can be operatively coupled to the control module 300 through one port of the communication interface 360. In such instances, the control module 300 can implement a second wired connection (e.g., current mode logic (CIVIL) signaling, also known as source coupled logic (SCL) signaling, analog signaling, combination of digital and analog signaling, and/or the like) with the serializer/deserializer module that is operatively coupled to the control module 300 through another port of the communication interface 360 (and vice-versa).

The processor 320 of the control module 300 can be, for example, a general purpose processor, a Field Programmable Gate Array (FPGA), an Application Specific Integrated Circuit (ASIC), a Digital Signal Processor (DSP), and/or the like. The processor 320 is configured to run and/or execute processes and/or other modules, instructions, and/or functions associated with the control module 300. The processor 320 includes a calibration signal computation module 322 and a pre-emphasis calculation module 324. As described above, the control module 300 can receive the output of the detectors (the first power error signal and the second power error signal) in the optical transmitter module via one or multiple input ports of the communication interface 360. The pre-emphasis calculation module 324 can receive the first power error signal and the second power error signal from the communication interface 360. As described above, the first power error signal and the second power error signal can either be based on an in-band input signal (generated by the serializer/deserializer module) or a first calibration signal and a second calibration signal (generated by the serializer/deserializer module).

The pre-emphasis calculation module 324 can compute the parameters of a pre-emphasis function based on the properties of the first power error signal and the second power error signal (e.g., magnitude of the signals, phase of the signals, frequency of the signals, etc.). The pre-emphasis calculation module 324 can generate a correction control signal that contains or represents information and/or instructions about the pre-emphasis function and can send the correction control signal to the electrical serializer/deserializer module. The serializer/deserializer module can generate and/or modify the pre-emphasized signal and send the pre-emphasized signal to the optical transmitter module such that the frequency-dependent distortions of the optical transmitter system can be substantially compensated (or equalized). In some instances, the equalization process described above can be a recursive process. In such instances, multiple pre-emphasized signals can be generated and sent to the optical transmitter module until the ratio of the power of the first power error signal and the power of the second power error signal is substantially equal to or below a pre-determined value (the pre-emphasis loop or circuit is converged). In some configurations, the pre-emphasis calculation module 324 can also generate and send a signal warning of an impending power failure of a SerDes (or DAC) module before regulated DC voltages in the host circuit board of the optical transmitter system (e.g., of the optical transmitter module or the serializer/deserializer module) goes out of the established specification range by monitoring the power (or voltage) levels in the first power error signal and/or the second power error signal. This can facilitate a pre-emptive replacement or switchover to another datapath, or a timely and orderly shutdown and an automatic restart of the optical transmitter system.

The calibration pattern computation module 322 can run and/or execute processes and/or other modules, instructions, and/or functions associated with the generation of the calibration digital bit streams at different frequency ranges. The calibration pattern computation module 322 can send (via the communication interface 360) to the calibration pattern generation module (e.g., calibration pattern generation module 286 in FIG. 2) a signal that contains or represents information and/or instructions about the calibration signal to send to the I-channel and the Q-channel of the optical transmitter system. For example, in some instances, the calibration signal computation module 322 can send instructions to the calibration signal generation module to generate and send a "11001100" repeating bit stream that corresponds to 8 GHz for a 32 Gbps data stream as the first calibration signal, and a "1111111100000000111111100000000" repeating bit stream that corresponds to 2 GHz for a 32 Gbps data stream as the second calibration signal. The parameters of the calibration signal (e.g., calibration bit stream profile, frequency of the calibration bit stream, etc.) can be computed and set by the calibration signal computation module 322 based on the compensation desired, for example, to minimize distortion caused by frequency dependent loss in the connection between the SerDes/DAC module (e.g., SerDes/DAC module 282 in FIG. 2) and the amplifiers (e.g., amplifiers 222 and 224 in FIG. 2).

The memory 340 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 340 can store data and instructions to cause the processor 320 to execute modules, processes and/or functions associated with the control module 300. The memory 340 includes a power database 342 and a pre-emphasis calculation database 344. In some instances, the power database 342 can store the values of the power associated with the first power error signal and the second power error signal for a single step equalization process. In others instances, the power database 342 can store the values of the power associated with the first power error signal and the second power error signal for each individual step of a multiple-step recursive equalization process. The power database 342 can also store the pre-determined tone ratio value (the desired value of the ratio of the power of the first power error signal to that of the power of the second power error signal) that is indicative of optimal performance of the optical transmitter system. The desired tone ratio value can be, for example, a value that can be manually set by a user or a manufacturer of the optical transmitter system.

The pre-emphasis calculation database 344 can store instructions and/or information that can be accessed by the pre-emphasis calculation module 324 to calculate the parameters of the pre-emphasized signal that can allow for optimal equalization of the transmitted signal from the optical transmitter system based on the output value of the detectors (of the optical transmitter module), (in some instances) the digital bit stream of the calibration signals, and frequency of the calibration signals. The entries of the pre-emphasis calculation database 344 can be updated repeatedly, on a periodic interval or on a substantially periodic interval. The pre-emphasis calculation database 344 can contain or represent the current information and/or instructions that can be used by the pre-emphasis calculation module 344 to compute the pre-emphasis parameters suitable for the optical transmitter system during the device startup, after reset, or can be continuously optimized in the background to compensate for changes in distortion or time-varying distortions (that can result in frequency-based fluctuations in the power of the transmitted signal). In some configurations, the pre-emphasis calculation database 344 can also store instructions and/or information that can be accessed by the pre-emphasis calculation module 324 to generate the correction control signal.

Figure 4:
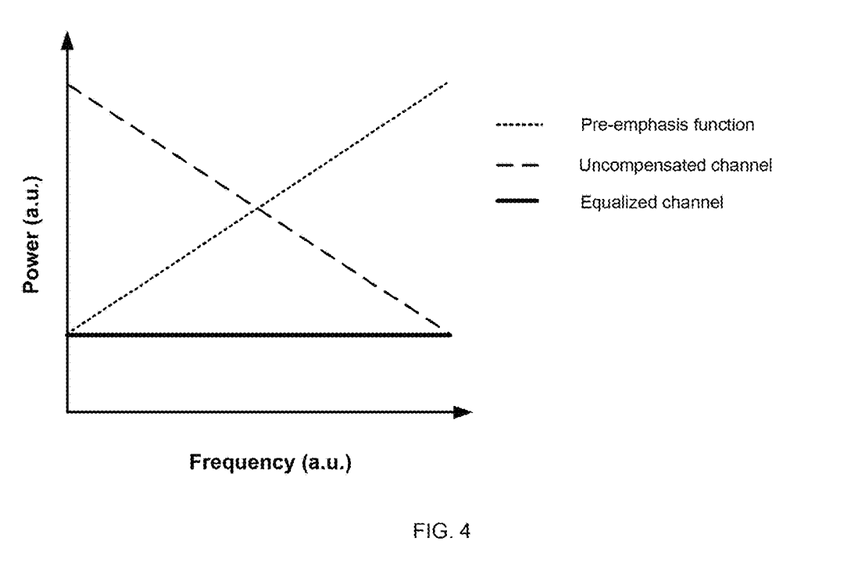
FIG. 4 is a graphical example of an uncompensated signal (or channel), a pre-emphasis (transfer or adjustment) function and the resulting compensated (or equalized) signal (or channel).

FIG. 4 is a graphical example of an uncompensated signal (or channel), a pre-emphasis (transfer or adjustment) function and the resulting compensated (or equalized) signal (or channel). The abscissa of the graph represents the frequency of operation of the optical transmitter system in arbitrary units (a.u.), and the ordinate of the graph represents the power of the transmitted signal in arbitrary units (a.u.). The uncompensated (transmitter output) signal displays frequency-based fluctuations in power. The power of the uncompensated signal has been shown to be monotonically decreasing with increasing frequency in FIG. 4 by way of example only and not by limitation. In other instances, the power of the uncompensated signal can display frequency-based fluctuations that can have other periodic, semi-periodic, random and/or non-random profiles. As described above, in some instances, the pre-emphasis function can be applied at the serializer/deserializer module (e.g., serializer/deserializer module 280 in FIG. 2) to compensate for the frequency-based fluctuations in the power (e.g., due to changes in distortion and/or time-varying distortions) of the transmitted signal (equalization process). Hence, the pre-emphasis function can counteract or alleviate the frequency-based power (or intensity) fluctuations of the uncompensated signal presented in FIG. 4. The compensation or equalization process leads to the generation of the equalized or compensated signal (shown by the bold line in FIG. 4) that can display a uniform or substantially uniform power (or intensity) levels across a wide frequency range. The profile of the pre-emphasis function has been shown to be monotonically increasing with increasing frequency in FIG.

4 by way of example only, and not by limitation. The pre-emphasis function shown in FIG. 4 is an example of a transfer function that can compensate for the frequency-based power fluctuations of the specific uncompensated signal shown in FIG. 4. In other instances, the frequency-based profile of the pre-emphasis function can have any periodic, semi-periodic, random and/or non-random profiles that can substantially compensate for the frequency-based power fluctuation for a variety of uncompensated signals. Note that the power (or intensity) levels of the compensated signal has been shown to be substantially uniform or flat over the desired frequency range in FIG. 4 by way of example only, and not by limitation. In other instances, the power (or intensity) levels of the compensated signal can also vary within a desired frequency range.

Figure 5:
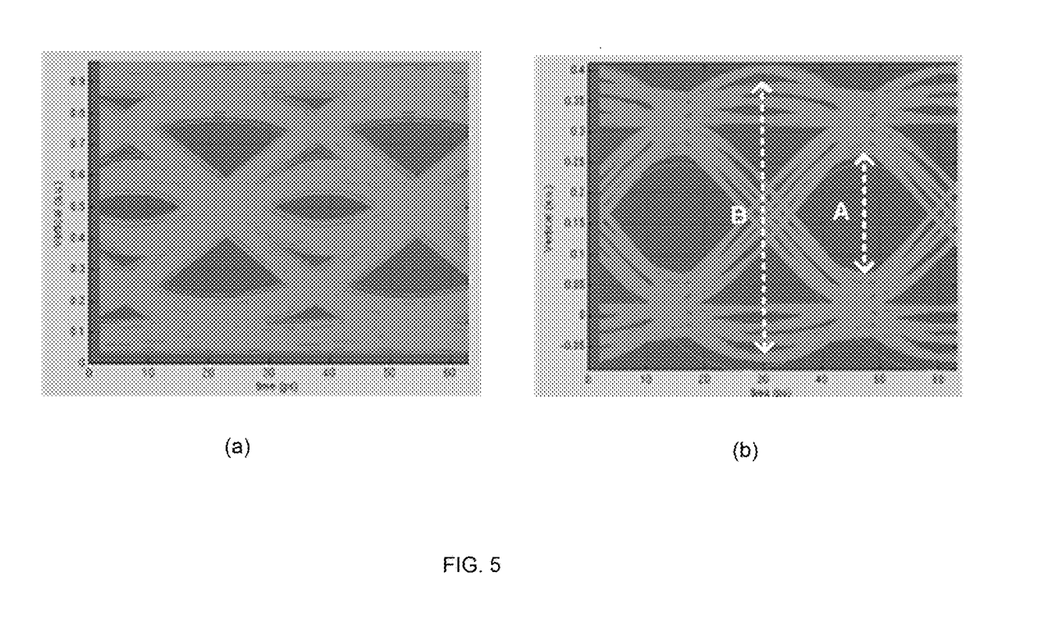
FIG. 5 is a graphical example of time domain eye diagrams for: (a) an uncompensated broadband on-off-keyed signal; and (b) a compensated broadband on-off-keyed signal.

FIG. 5 is a graphical example of time domain eye diagrams for: (a) an uncompensated broadband on-off-keyed signal; and (b) a compensated broadband on-off-keyed signal. The eye diagram is an oscilloscope display in which a digital data signal from an electrical device is repetitively sampled and applied to the vertical input or axis, while the data rate is used to trigger the horizontal axis sweep. Because high speed digital signals can exceed multiple Gigabit per second (Gbps) speeds, eye diagrams can provide a way to measure signal quality and system performance. The eye diagram allows different parameters of the electrical quality of the signal to be (quickly) visualized and determined.

The eye diagram is constructed from a digital waveform by folding the parts of the waveform corresponding to each individual bit into a single graph with signal amplitude on the vertical axis and time on the horizontal axis. FIG. 5(a) is a graphical example of a time domain eye diagram for an uncompensated broadband on-off-keyed (OOK) signal. Eye height is a measure of the vertical opening of an eye diagram as shown by the dotted line marked "A" in FIG. 5(b). The eye height measurement is an indication of the eye closure due to noise and distortion. The signal to noise ratio of a high speed data signal is also directly indicated by the amount of eye closure. The eye diagram of the uncompensated signal in FIG. 5(a) shows a relatively low value for the eye height (i.e., displaying eye closure). The low value for eye height is indicative of the presence of noise in the signal or a low signal to noise ratio. An "ideal" eye opening measurement (i.e., with low noise or substantially low noise) would be equal to the eye amplitude measurement, where the eye amplitude is the difference between the one and zero levels of the eye diagram as shown by the dotted line marked "B" in FIG. 5(b). The eye diagram of the uncompensated signal in FIG. 5(a) also does not show a clear eye pattern during each unit interval (UI) width of the digital bit pattern, and the rise time and fall time of the eye pattern cannot be computed in the time window presented in FIG. 5(a). This can be indicative of significant signal impairment due to, for example, distortion, attenuation, noise, crosstalk, jitter, and/or the like.

Compensation or equalization of the uncompensated signal using pre-emphasis (e.g., the pre-emphasis function as described in FIGS. 1-4) leads to the generation of the compensated signal. The time domain eye diagram of the compensated broadband OOK signal is shown in FIG. 5(b). The eye diagram of the compensated signal in FIG. 5(b) shows a substantial increase in the eye height, the presence of clear eye patterns during each unit interval (UI) width of the digital bit pattern, and a shorter rise time and fall time (approximately 20 ps) that can be calculated in the time window presented in FIG. 5(b). Such significant improvement in the eye diagram of the compensated signal is indicative of the utility of using the pre-emphasis to compensate for the frequency-based power fluctuations of the transmitted signal from the optical transmitter system. Note that an OOK signal is presented in FIG. 5 as an example of a possible signal that can be compensated or equalized by the method described in FIGS. 1-4. OOK signals are applicable for digital modulation schemes such as, for example, binary phase-shift keying (BPSK) modulation and quadrature phase-shift keying (QPSK) modulation. In other instances, other type of signals (e.g., multi-level signals) can be compensated or equalized by the method described in FIGS. 1-4 for other modulation techniques such as, for example, quadrature amplitude modulation (QAM) that is both an analog and a digital modulation scheme.

Figure 6:
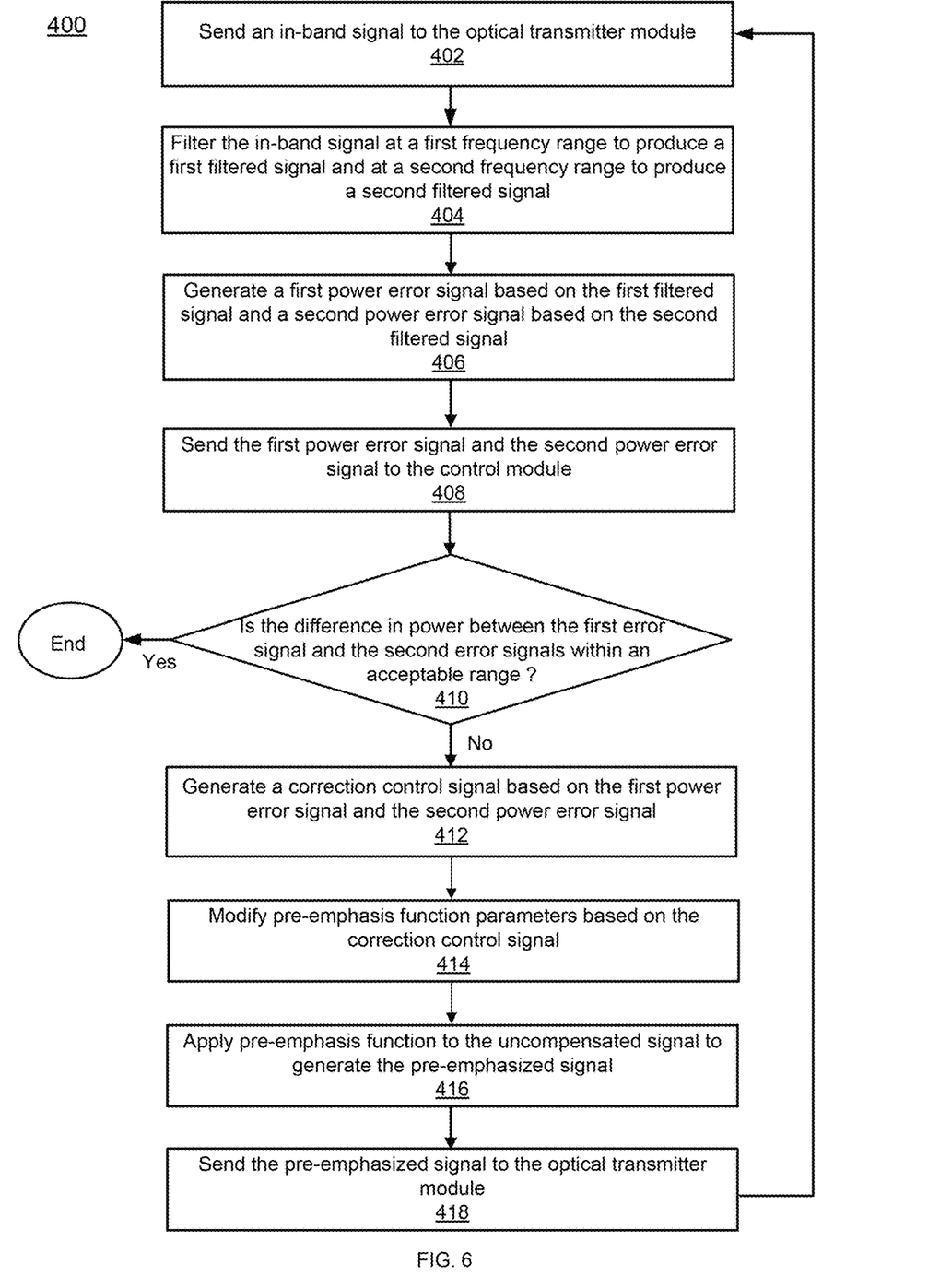
FIG. 6 is a flow chart illustrating a method for the compensation of frequency-based transmitted signal power fluctuations, according to a first embodiment.

FIG. 6 is a flow chart illustrating a method for the compensation of frequency-based transmitted signal power fluctuations, according to a first embodiment. The method 400 includes sending an input in-band signal from, for example, a serializer/deserializer module to, for example, an optical transmitter module, at 402. As described above, in some instances, the serializer/deserializer module can be a hardware module and can generate the input in-band signal and can send the in-band signal to the I-channel modulator and the Q-channel modulator of the optical transmitter system via a set of amplifiers (or drivers). As described above, the optical transmitter module can include one or multiple electrical detectors that are operably coupled to the amplifiers. The electrical detectors can sample a portion of the in-band signal. In some instances, the detectors can include one or multiple filters that can filter the in-band signal at different frequency ranges.

The input in-band signal is filtered at a first frequency range to produce a first filtered signal and at a second frequency range to produce a second filtered signal, at 404. As described above, the first frequency range is different from the second frequency range. In such instances, the amplifiers (or drivers) in the optical transmitter module are activated (i.e., not disabled) when the detectors in the optical transmitter module receive the in-band input signal from the serializer/deserializer module. In such instances, the optical shutter does not have to be in the closed configuration to block the transmitted signal of the optical transmitter system. In some configurations, the electrical detectors may not include separate filter units or modules, but the frequency range of operation of the electrical detectors can serve as a de-facto filtration mechanism for the in-band signal to generate the first filtered signal and the second filtered signal.

The first power error signal and the second power error signal are generated at, for example, the optical transmitter module, at 406. As described above, the first power error signal is based on the first filtered signal and the second power error signal is based on the second filtered signal. The power error signals are generated by the detector(s) of the optical transmitter module and can be based on the properties of the filtered signals (i.e., magnitude of the signals, phase of the signals, frequency of the signals, etc.). After generation of the first power error signal and the second power error signal, the first power error signal and the second power error signal can be sent from, for example, the optical transmitter module to, for example, the control module, at 408.

The first power error signal and the second power error signal can be processed and compared at, for example, the control module to determine if there are notable frequency-based signal power (or intensity) fluctuations, at 410. The first power error signal and the second power error signal can be received by the control module via one or multiple ports of the communication interface of the control module. As described above, the processing and analysis of the power error signals can be performed by, for example, comparing the magnitude of the first power error signal to the magnitude of the second power error signal and determining if the ratio of the magnitudes (or tone ratio of the power error signal) is less than a pre-determined level. Said in another way, the comparison of the magnitude of the first power error signal to the magnitude of the second power error signal is performed to determine if the difference in power between the first error signal and the second error signals is within an acceptable (pre-determined) range. Such computations can take place, for example, in the processor of the control module. In some instances, the ratio of the magnitude of the power error signals can be less than or equal to the pre-determined level. In such instances, the (low) value of the ratio the power error signals can indicate that notable frequency-based signal power (or intensity) fluctuations do not exist (i.e., the difference in power between the first error signal and the second error signals can be within an acceptable range) and the method for the compensation of frequency-based transmitted signal power fluctuations ends. Note that in this embodiment, the input signal that is being filtered (at two frequency ranges) to generate the first power error signal and the second power error signal is the in-band input data (i.e., actual data). In such embodiments, the power spectrum of the input signal is not known by the SerDes/DAC module before the input signal is sent to the optical transmitter module. Hence, a portion of the in-band input signal can be tapped off and used by, for example, the SerDes/DAC module to measure the power spectrum of the input signal before the input signal is sent to the optical transmitter module. Such measurements can serve as the reference signals, which are compared against the power spectrum of the signals received by the detectors (e.g., detectors 230 and 234 in FIG. 2), to determine the frequency-based distortion introduced by the optical transmitter system. In this situation, although not shown in FIG. 2 or 6, serializer/deserializer module 280 can send reference signals to control module 260 so that control module 260 can perform the comparison of the reference signals against the power spectrum of the signals received by the detectors.

In other instances, the ratio of the magnitude of the power error signals can be greater than the pre-determined level (i.e., the difference in power between the first error signal and the second error signals is not within an acceptable pre-determined range). In such instances, the value of the ratio of the power error signals can indicate that notable frequency-based signal power (or intensity) fluctuations may exist. In such instances, a correction control signal is generated at, for example, the control module that is based on the first power error signal and the second power error signal, at 412. As described above, the correction control signal can be generated based on the properties of the power error signals (e.g., the relative magnitude of the power error signals, the phase of the power error signals, the frequency of the power error signals, etc.). After generation of the correction control signal, the correction control signal can be sent from, for example, the control module to, for example, the serializer/deserializer module via the a port on the communication interface of the control module.

After successful reception of the correction control signal at, for example, the serializer/deserializer module, the parameters of the pre-emphasis function can be modified at the serializer/deserializer module based on the correction control signal, at 414. The pre-emphasis function can include information that can be used in the equalization or compensation of the uncompensated signal at the two frequency ranges used to generate the first power error signal and the second power error signal. For frequencies outside the above mentioned frequency ranges, linear or non-liner interpolation methods can be applied by the pre-emphasis generation module to generate the pre-emphasized signal.

The pre-emphasis function can be applied to the uncompensated signal, at for example, the serializer/deserializer module to generate the pre-emphasized signal, at 416. As described above, the pre-emphasized signal can counteract or alleviate the frequency-based power fluctuations introduced by the channel. This compensation or equalization process can lead to the generation of the equalized (or compensated) channel that can display a uniform or substantially uniform signal power levels across a wide frequency range (or across the entire operational frequency range of the optical transmitter system). The frequency-based power profile of the pre-emphasized signal can be for example, monotonically increasing with increasing frequencies, monotonically decreasing with increasing frequencies, or can have any periodic, semi-periodic, random and/or non-random profiles that can compensate for the frequency-based power profile of a variety of channels. The signal equalization (or compensation) process iterates until the desired pre-emphasis correction applied to the signal is less than a pre-determined value, at which point the signal compensation loop is considered to have converged. The (final) pre-emphasized signal is sent from, for example, the serializer/deserializer module to, for example, the optical transmitter module, at 418.

Figure 7:
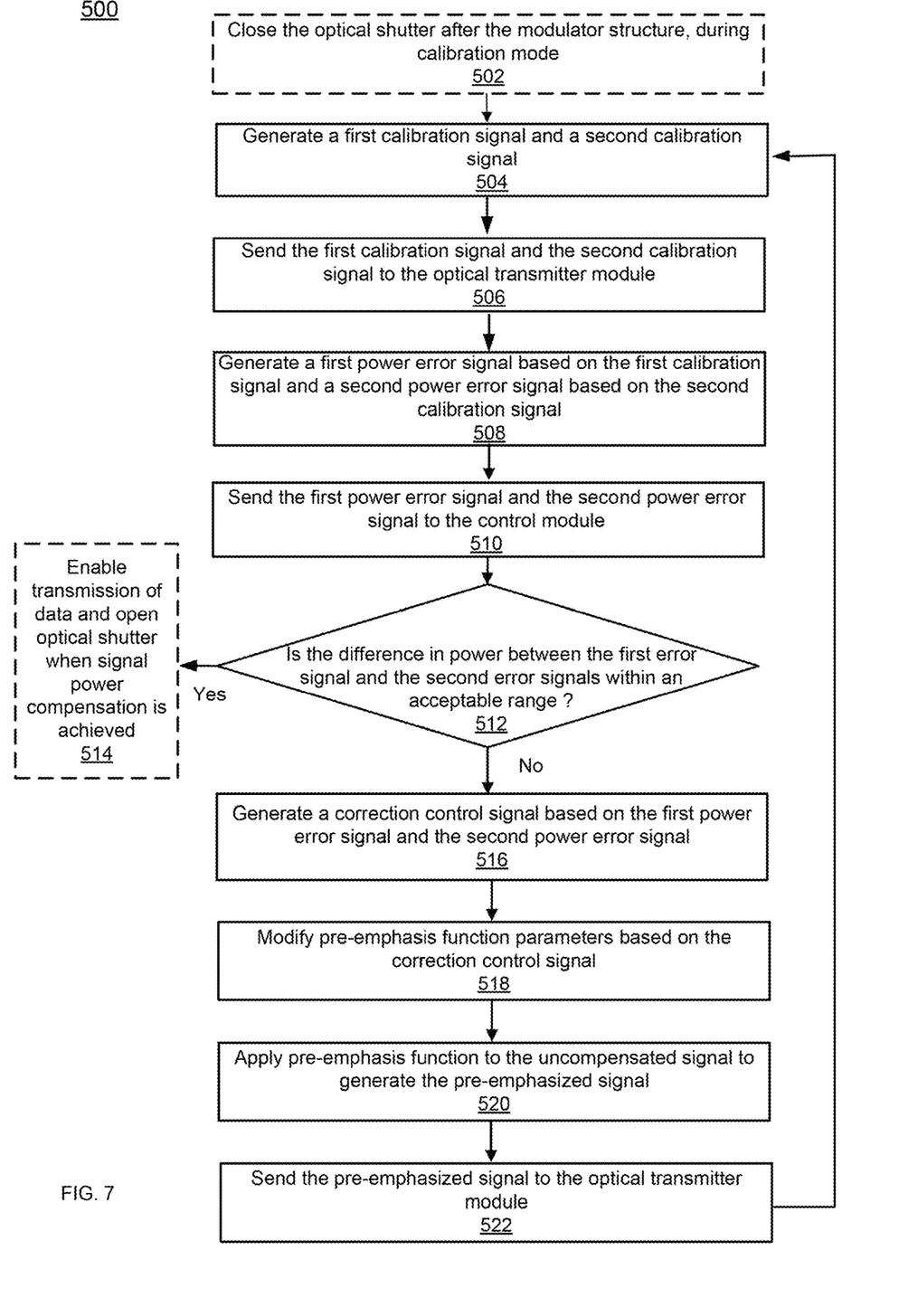
FIG. 7 is a flow chart illustrating a method for the compensation of frequency-based transmitted signal power fluctuations, according to a second embodiment.

FIG. 7 is a flow chart illustrating a method for the compensation of frequency-based transmitted signal power fluctuations, according to a second embodiment. The method 500 includes, optionally (as denoted by the dashed box), closing the optical shutter (e.g., located after the I-channel and Q-channel modulators in FIG. 2) before the tunable laser is enabled and the calibration signals are generated so that the optical transmitter system output can be blocked during the during signal equalization (or compensation) process, at 502.

A first calibration signal and a second calibration signal can be generated at, for example, the serializer/deserializer module, at 504. The first calibration signal includes digital data associated with a first frequency and the second calibration signal includes digital data associated with a second frequency, where the first frequency is different from the second frequency. As described above, the (digital) calibration signals can be a specific kind of electrical waveform varying between two voltage levels that correspond to two logic states (e.g., 'low state' for '0' and 'high state' for '1', respectively). The voltage levels generated by the calibration signal generation module can be compatible with digital electronics input/output (I/O) standards such as, for example, Transistor-Transistor Logic (TTL), Low-voltage TTL (LVTTL), Low Voltage Complementary Metal Oxide Semiconductor (LVCMOS), Low-voltage differential signaling (LVDS), and/or the like. As described above, in some instances, the first calibration signal can be a "11001100" repeating digital bit stream that corresponds to 8 GHz for a 32 Gbps data stream, and the second calibration signal can be a "1111111100000000111111111100000000" repeating digital bit stream that corresponds to 2 GHz for a 32 Gbps data stream. The parameters of the calibration signal (e.g., calibration digital bit stream profile, frequency of the calibration digital bit stream, etc.) can be computed and set by the calibration signal computation module (of the control module) based on the compensation desired for the frequency-based transmitted signal power fluctuations. The first calibration signal and the second calibration signal are sent from, for example, the serializer/deserializer module, to, for example, the optical transmitter module, at 506.

The first power error signal and the second power error signal are generated at, for example, the optical transmitter module, at 508. As described above, the first power error signal is based on the first calibration signal and the second power error signal is based on the second calibration signal. The power error signals are generated by the detector(s) of the optical transmitter module and can be based on the properties of the calibration signals (e.g., magnitude of the signals, phase of the signals, frequency of the signals, etc.). After generation of the first power error signal and the second power error signal, the first power error signal and the second power error signal are sent from, for example, the optical transmitter module to, for example, the control module, at 510.

The first power error signal and the second power error signal can be processed and compared at, for example, the control module to determine if there are notable frequency-based signal power (or intensity) fluctuations, at 512. As described above, the processing of the power error signals can be performed by, for example, comparing the magnitude of the first power error signal to the magnitude of the second power error signal and determining if the ratio of the magnitudes (or tone ratio of the power error signal) is less than a pre-determined level. Said in another way, the comparison of the magnitude of the first power error signal to the magnitude of the second power error signal is performed to determine if the difference in power between the first error signal and the second error signals is within an acceptable (pre-determined) range. As described above, such processing can take place, for example, in the processor of the control module. In some instances, the ratio of the magnitude of the power error signals can be less than or equal to the pre-determined level. In such instances, the value of the ratio the magnitude of the power error signals can indicate that notable frequency-based signal power (or intensity) fluctuations do not exist (i.e., the difference in power between the first error signal and the second error signals is within an acceptable range). In such instances, the transmission of data can be enabled and optionally (as indicated by the dashed box), the optical shutter can be brought into the second configuration (i.e., opened) and the method for the compensation of the frequency-based transmitted signal power fluctuations can end, at 514.

In other instances, the ratio of the magnitude of the power error signals can be greater than the pre-determined level (i.e., the difference in power between the first error signal and the second error signals is not within an acceptable pre-determined range). In such instances, the value of the ratio of the power error signals can indicate that notable frequency-based signal power (or intensity) fluctuations may exist. In such instances, a correction control signal is generated at, for example, the control module that is based on the first power error signal and the second power error signal, at 516. The correction control signal can be generated based on the properties of the power error signals as described above. After generation of the correction control signal, the correction control signal can be sent from, for example, the control module to, for example, the serializer/deserializer module as described above.

After successful reception of the correction control signal at, for example, the serializer/deserializer module, the parameters of the pre-emphasis function can be modified at, for example, the serializer/deserializer module based on the correction control signal, at 518. The pre-emphasis function can include information that can be used in the equalization or compensation of the uncompensated signal at the frequency ranges of the calibration signals used to generate the first power error signal and the second power error signal. For frequencies outside the above mentioned frequency ranges, linear or non-liner interpolation methods can be applied by the pre-emphasis generation module to generate the pre-emphasized signal.

The pre-emphasis function can be applied to the uncompensated signal, at for example, the serializer/deserializer module to generate the pre-emphasized signal, at 520. As described above, the pre-emphasized signal can counteract or alleviate the frequency-based power fluctuations of the channel. This compensation or equalization process can lead to the generation of the equalized (or compensated) channel that can display a uniform or substantially uniform signal power levels across a wide frequency range (or across the entire operational frequency range of the optical transmitter system). The frequency-based power profile of the pre-emphasized signal can be for example, monotonically increasing with increasing frequencies, monotonically decreasing with increasing frequencies, or can have any periodic, semi-periodic, random and/or non-random profiles that can compensate for the frequency-based power profile of a variety of uncompensated signals. The signal equalization (or compensation) process iterates until the desired pre-emphasis correction applied to the signal is less than a pre-determined value, at which point the signal compensation loop is considered to have converged. The (final) pre-emphasized signal is sent from, for example, the serializer/deserializer module to, for example, the optical transmitter module, at 522.

The methods and apparatus shown in FIGS. 1-7 can automatically set the SerDes TX pre-emphasis settings for an optical transmitter system that can compensate for fluctuations in the power levels of transmitted signal due to, for example, the effects of temperature variations and temporal variations. Known methods can be suitable for 10 G systems such as those that use small form-factor pluggable (SFP)+ interfaces, but are not adequate for high symbol rate and high performance applications such as 100 G coherent Dense Wave Division Multiplexing (DWDM) interfaces (25 Gigasymbol/s to 32 Gigasymbol/s). The demands for signal compensation grow more stringent as the symbol rate (Baud rate) increases and/or the order of modulation increases (i.e., encoding more bits per symbol) such as those for 16QAM at 4 bits/Symbol (compared to 4QAM at 2 bits/symbol).

The methods and apparatus shown in FIGS. 1-7 have the advantage of providing optimization of the pre-emphasized signal through a combination of an out-of-band communication channel between the optical transmitter module (a pluggable module) and the SerDes/DAC module, electrical detector(s) in the optical transmitter module, and pre-determined digital calibration signals (e.g., digital bit streams at different frequencies) that are sent to the SerDes/DAC module. Additionally, the detectors can also be small, low power circuits that can be readily added to the amplifiers in a variety of photonic modules. The methods and apparatus shown in FIGS. 1-7 can also be applied to or embodied in a variety of optical transmitter systems such as, for example, an optical M-ary quadrature amplitude modulated (M-QAM) transmitter, a polarization multiplexed (PM)

M-QAM transmitter where two or more M-QAM transmitters in substantially orthogonal polarization states are multiplexed in the polarization domain. The M-QAM transmitter can be paired with either a direct detection receiver or a coherent receiver. Specific examples include direct detection differential QPSK (DOPSK), coherent PM-QPSK (i.e., coherent PM-4-QAM), coherent PM-16-QAM, and/or the like. Additionally, the methods and apparatus described herein can apply to both a single polarization transmitter and a polarization-multiplexed transmitter.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a communication interface;
a memory configured to store processor executable instructions; and
a processor operatively coupled to the communication interface and the memory, upon execution of the processor executable instructions, the processor configured to:
control the communication interface to receive, from an optical transmitter, a first power error signal and a second power error signal, the first power error signal received based on an in-band signal;
generate a correction control signal based on the first power error signal and the second power error signal; and
control the communication interface to send the correction control signal to an electrical serializer/deserializer operatively coupled to the optical transmitter, the correction control signal configured to cause the serializer/deserializer to modify a pre-emphasis setting,
the first power error signal, the second power error signal, and the correction control signal being out-of-band.

2. The apparatus of claim 1, wherein the processor is configured to generate the correction control signal based on comparing a magnitude of the first power error signal and a magnitude of the second power error signal.

3. The apparatus of claim 1, wherein the processor is configured to generate the correction control signal based on comparing a phase of the first power error signal and a phase of the second power error signal.

4. The apparatus of claim 1, wherein the processor is configured to generate the correction control signal based on comparing a frequency of the first power error signal and a frequency of the second power error signal.

5. The apparatus of claim 1, wherein a difference between a magnitude of the first power error signal and a magnitude of the second power error signal exceeds a predetermined level.

6. The apparatus of claim 1, wherein the processor is configured to control the communication interface to receive the first power error signal from an electrical detector in the optical transmitter.

7. The apparatus of claim 1, wherein the processor is configured to:
control the communication interface to receive the first power error signal from an electrical detector in the optical transmitter, the electrical detector including at least one filter to filter the in-band signal at a plurality of frequency ranges.

8. The apparatus of claim 1, wherein the processor is configured to:
control the communication interface to receive the first power error signal that is generated from a first calibration signal of a first frequency; and
control the communication interface to receive the second power error signal that is generated from a calibration signal of a second frequency.

9. The apparatus of claim 1, wherein the processor is configured to:
control the communication interface to receive the first power error signal from a first electrical detector in the optical transmitter, the first power error signal being associated with a first filtered signal produced by the first electrical detector by filtering the in-band signal for a first frequency range; and
control the communication interface to receive the second power error signal from a second electrical detector, the second power error signal being associated with a second filtered signal produced by a second electrical detector by filtering the in-band signal for a second frequency range different from the first frequency range.

10. A non-transitory processor-readable medium storing code representing instructions to be executed by a processor, the code comprising code to cause the processor to:
control a communication interface operatively coupled to the processor to receive, from an optical transmitter, a first power error signal and a second power error signal;
generate a correction control signal based on the first power error signal and the second power error signal; and
control the communication interface to send the correction control signal to an electrical serializer/deserializer generating an in-band signal and operatively coupled to the optical transmitter, the correction control signal configured to cause the serializer/deserializer to modify a pre-emphasis setting,
the first power error signal, the second power error signal, and the correction control signal being out-of-band.

11. The non-transitory processor-readable medium of claim 10, wherein the code comprises code to cause the processor to control the communication interface to receive the first power error signal based on the in-band signal.

12. The non-transitory processor-readable medium of claim 10, wherein the code comprises code to cause the processor to generate the correction control signal based on comparing a magnitude of the first power error signal and a magnitude of the second power error signal.

13. The non-transitory processor-readable medium of claim 10, wherein the code comprises code to cause the processor to generate the correction control signal based on comparing a phase of the first power error signal and a phase of the second power error signal.

14. The non-transitory processor-readable medium of claim 10, wherein the code comprises code to cause the processor to generate the correction control signal based on comparing a frequency of the first power error signal and a frequency of the second power error signal.

15. The non-transitory processor-readable medium of claim 10, wherein a difference between a magnitude of the first power error signal and a magnitude of the second power error signal exceeds a predetermined level.

16. The non-transitory processor-readable medium of claim 10, wherein the code comprises code to cause the processor to control the communication interface to receive the first power error signal from an electrical detector in the optical transmitter.

17. The non-transitory processor-readable medium of claim 10, wherein the code comprises code to cause the processor to:
control the communication interface to receive the first power error signal from an electrical detector in the optical transmitter, the electrical detector including at least one filter to filter the in-band signal at a plurality of frequency ranges; and
control the communication interface to receive the first power error signal based on the in-band signal.

18. The non-transitory processor-readable medium of claim 10, wherein the code comprises code to cause the processor to:
control the communication interface to receive the first power error signal that is generated from a first calibration signal of a first frequency; and
control the communication interface to receive the second power error signal that is generated from a calibration signal of a second frequency.

19. The non-transitory processor-readable medium of claim 10, wherein the code comprises code to cause the processor to:
control the communication interface to receive the first power error signal from a first electrical detector in the optical transmitter, the first power error signal being associated with a first filtered signal produced by the first electrical detector by filtering the in-band signal for a first frequency range; and
control the communication interface to receive the second power error signal from a second electrical detector, the second power error signal being associated with a second filtered signal produced by a second electrical detector by filtering the in-band signal for a second frequency range different from the first frequency range.

* * * * *